UNITED STATES PATENT OFFICE.

FRIEDRICH STOLZ, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

1-P-DIMETHYLAMINOPHENYL-3.4.4-TRIMETHYL-5-PYRAZOLONE AND PROCESS OF MAKING SAME.

1,017,699.   Specification of Letters Patent.   Patented Feb. 20, 1912.

No Drawing.   Application filed June 13, 1911.   Serial No. 632,912.

*To all whom it may concern:*

Be it known that I, FRIEDRICH STOLZ, Ph. D., chemist, a citizen of the Empire of Germany, residing at Höchst-on-the-Main, Germany, have invented certain new and useful Improvements in 1-P-Dimethylaminophenyl-3.4.4-Trimethyl-5-Pyrazolone and Processes of Making Same, of which the following is a specification.

I have found that a new compound of great value owing to its antipyretic action can be obtained by methylating the 1-p.aminophenyl-3.4.4-trimethyl-5-pyrazolone. This new compound may be designated "1-para-dimethylaminophenyl-3.4.4-trimethyl-5-pyrazolone."

The 1-p-aminophenyl-3.4.4-trimethyl-5-pyrazolone can be produced from 1-phenyl-3.4.4-trimethyl-5-pyrazolone by the action of concentrated nitric acid in presence of concentrated sulfuric acid and subsequent reduction of the resulting nitrophenyltrimethylpyrazolone by means of tin and hydrochloric acid. Methyl-iodid or dimethyl-sulfate are particularly suitable for the methylation of the amino compound, but there may also be used other processes for the introduction of the methyl groups.

In order to illustrate the process more fully the following example is given:—100 parts by weight of 1-phenyl-3.4.4-trimethyl-5-pyrazolone are dissolved at 10–20° C. in 700 parts of concentrated sulfric acid. There are then added drop by drop at 0° to +5° C., while stirring, 125 parts of a mixture of fuming nitric acid and concentrated sulfuric acid, containing 26 per cent. of $NO_3H$. The product of the reaction is poured in ice-water and the precipitate of 1-p.nitrophenyl-3.4.4-trimethyl-5-pyrazolone thus formed is filtered off and washed with water. By recrystallization from alcohol, the nitro derivative is obtained in the form of faint-yellow needles, melting at 126° C., insoluble in water and diluted acids.

100 parts by weight of 1-p.nitrophenyl-3.4.4-trimethyl-5-pyrazolone are poured over with 400 parts of concentrated hydrochloric acid and then there are gradually added, while stirring, 115 parts of tin, whereupon the mass is heated until all the tin is dissolved. After having diluted the mass with water, the dissolved tin is precipitated by means of hydrogen sulfid, and the filtrate of the tin sulfid is evaporated. After cooling, the chlorhydrate of the 1-p.-aminophenyl-3.4.4-trimethyl-5-pyrazolone crystallizes out and from this the free base is precipitated by means of caustic soda-lye, at first as an oily mass which, on stirring, becomes a white crystalline powder. By recrystallization from benzene-ligroin the p-aminophenyltrimethylpyrazolone is obtained in the form of white needles, melting at 116° C. It is insoluble in water but readily soluble in diluted acids, and its acid solution may be diazotized by means of nitrous acid.

100 parts by weight of 1-para-aminophenyl-3.4.4-trimethyl-5-pyrazolone are heated with 70 parts of methyl-iodid and 50 parts of methyl alcohol for 6–8 hours to 90–100° C. After distilling the alcohol the residue is dissolved in water. The solution thus obtained is oversaturated with alkali and the resulting dimethylaminophenyltrimethylpyrazolone is extracted by shaking with ether. The base, remaining after distillation of the solvent as an oily mass, soon solidifies into a crystalline mass. By recrystallization from diluted alcohol, white crystals are obtained, melting at 58–59° C.

The 1-p-dimethylaminophenyl-3.4.4-trimethyl-5-pyrazolone is difficultly soluble in water, readily soluble in alcohol, ether and benzene. When treated with hydrochloric acid it forms a well crystallizing salt readily soluble in water; its aqueous solution assumes a beautiful bluish-violet color by addition of ferric chlorid.

Having now particularly described my invention what I claim is:

1. As a new product, the 1-p-dimethylaminophenyl-3.4.4-trimethyl-5-pyrazolone, being a white crystalline powder, melting at 58–59° C., scarcely soluble in water, readily soluble in ether, alcohol, benzene and acids.

the solution of its chlorhydrate in water assuming by addition of ferric chlorid a bluish-violet color.

2. The process of manufacturing 1-p-dimethylaminophenyl-3.4.4-trimethyl 5-pyrazolone, which consists in methylating 1-p-aminophenyl-3.4.4-trimethyl-5-pyrazolone.

In testimony whereof, I affix my signature in presence of two witnesses.

FRIEDRICH STOLZ.

Witnesses:
　JEAN GRUND,
　CARL GRUND.